(12) United States Patent
Korb et al.

(10) Patent No.: US 12,228,227 B2
(45) Date of Patent: Feb. 18, 2025

(54) CONNECTION ELEMENT FOR AN EXHAUST SYSTEM OF AN INTERNAL COMBUSTION ENGINE

(71) Applicant: Purem GmbH, Neunkirchen (DE)

(72) Inventors: Hagen Korb, Aichwald (DE); Christoph Gotthard, Esslingen (DE); Kresimir Jambrosic, Reichenbach an der Fils (DE)

(73) Assignee: Purem GmbH, Neunkirchen (DE)

(*) Notice: Subject to any disclaimer, the term of this patent is extended or adjusted under 35 U.S.C. 154(b) by 20 days.

(21) Appl. No.: 18/065,688

(22) Filed: Dec. 14, 2022

(65) Prior Publication Data

US 2023/0184357 A1    Jun. 15, 2023

(30) Foreign Application Priority Data

Dec. 14, 2021   (DE) .................... 10 2021 132 929.9

(51) Int. Cl.
*F16L 23/04* (2006.01)
*F16L 23/024* (2006.01)

(52) U.S. Cl.
CPC ............. *F16L 23/04* (2013.01); *F16L 23/024* (2013.01)

(58) Field of Classification Search
CPC ....... F16L 23/04; F16L 23/024; F16L 23/032; F01N 13/1844; F01N 2470/00
USPC ........................................................ 285/406
See application file for complete search history.

(56) References Cited

U.S. PATENT DOCUMENTS

| 2,131,552 | A |   | 9/1938 | Lin |   |
|---|---|---|---|---|---|
| 4,362,327 | A |   | 12/1982 | Mieth |   |
| 4,743,035 | A | * | 5/1988 | Van Loom | F16J 15/0887 |
|   |   |   |   |   | 285/187 |
| 5,605,174 | A | * | 2/1997 | Schlecht | F23G 5/442 |
|   |   |   |   |   | 137/896 |
| 2008/0179880 | A1 | * | 7/2008 | Vitel | F16L 23/032 |
|   |   |   |   |   | 285/184 |
| 2021/0346931 | A1 | * | 11/2021 | Kojima | B21D 19/082 |

FOREIGN PATENT DOCUMENTS

| CN |   | 112648046 A | 4/2021 |
|---|---|---|---|
| DE |   | 29 10 684 A1 | 10/1980 |
| DE | 10 2011 106 620 A1 | | 12/2011 |
| DE | 10 2018 109 608 A1 | | 10/2019 |

\* cited by examiner

*Primary Examiner* — James M Hewitt, II
(74) *Attorney, Agent, or Firm* — Walter Ottesen, P.A.

(57) ABSTRACT

A connection element for an exhaust system of an internal combustion engine includes a connection element body extending in the direction of a connection element longitudinal axis. An inner circumferential surface of the connection element body delimits an exhaust gas passage of the connection element and a connecting flange extends radially outward from the connection element body and surrounds the longitudinal axis. The connecting flange has an abutment surface oriented in the direction of a first axial end of the connection element body. A section of the connection element body defines the first axial end thereof. A centering section has a centering outer circumferential surface and a depression surrounds the longitudinal axis and has a depression surface which is offset axially in the direction away from the first axial end with respect to the abutment surface.

17 Claims, 2 Drawing Sheets

CONNECTION ELEMENT FOR AN EXHAUST SYSTEM OF AN INTERNAL COMBUSTION ENGINE

CROSS REFERENCE TO RELATED APPLICATION

This application claims priority of German patent application no. 10 2021 132 929.9, filed Dec. 14, 2021, the entire content of which is incorporated herein by reference.

TECHNICAL FIELD

The present disclosure relates to a connection element for an exhaust system of an internal combustion engine, including a connection element body, which is, for example, substantially tubular, extending in the direction of a connection element longitudinal axis, wherein an inner circumferential surface of the connection element body delimits an exhaust gas passage of the connection element, and a connecting flange region extending radially outward from the connection element body and surrounding the connection element longitudinal axis, wherein the connecting flange region has an abutment surface oriented in the direction of a first axial end of the connection element body, and wherein a section of the connection element body which projects axially beyond the abutment surface and provides the first axial end of the connection element body provides a centering section having a centering outer circumferential surface.

BACKGROUND

Connection elements of this type can be used to connect successive components or system regions to one another firmly and in a gastight manner in an exhaust system of an internal combustion engine in a vehicle. In particular, connection elements of this type can be used to attach that part of an exhaust system which follows a turbocharger to the turbocharger. For this purpose, the turbocharger can include a mating connection element which is complementary to the connection element and on which the connection element is positioned in such a way, with its abutment surface bearing thereon, that the centering section engages in an exhaust gas passage of the mating connection element and thus predetermines a defined positioning of the connection element with respect to the mating connection element transversely with respect to the connection element longitudinal axis. The connection element and the mating connection element can be firmly coupled to one another via a, for example clamp-like, connecting member.

SUMMARY

It is an object of the present disclosure to provide a connection element for an exhaust system of an internal combustion engine which has increased resistance to mechanical and thermal loads.

This object can, for example, be achieved by a connection element for an exhaust system of an internal combustion engine, including:
  a connection element body, which is, for example, substantially tubular, extending in the direction of a connection element longitudinal axis, wherein an inner circumferential surface of the connection element body delimits an exhaust gas passage of the connection element,
  a connecting flange region extending radially outward from the connection element body and surrounding the connection element longitudinal axis, wherein the connecting flange region has an abutment surface oriented in the direction of a first axial end of the connection element body,
wherein a section of the connection element body which projects axially beyond the abutment surface and provides the first axial end of the connection element body provides a centering section having a centering outer circumferential surface, wherein a depression surrounding the connection element longitudinal axis and having a depression surface which is offset axially in the direction away from the first axial end with respect to the abutment surface or/and is offset radially inward with respect to the centering outer circumferential surface is provided in a transitional region between the abutment surface and the centering outer circumferential surface.

By providing the depression in the transitional region between the abutment surface and the centering outer circumferential surface, a sharp-edged transition between these two surfaces with an angle in the range of about 90° is avoided. In this transitional region, therefore, the occurrence of stress peaks is very largely prevented, thus significantly reducing the risk that thermal and mechanical loads on the connection element which occur in this region may lead to the formation of cracks in the material of the connection element, which is generally composed of metal material.

For a construction which is simple to implement and operates reliably, it is proposed that the abutment surface is oriented substantially orthogonally with respect to the connection element longitudinal axis or/and completely surrounds the connection element longitudinal axis.

The centering outer circumferential surface can be of substantially cylindrical configuration with respect to the connection element longitudinal axis, having, for example, a circular cross section. The centering outer circumferential surface preferably completely surrounds the connection element longitudinal axis for a reliable centering effect.

In order to be able to obtain the protective effect of the depression in the entire circumferential region, it is proposed that the depression completely surrounds the connection element longitudinal axis.

The occurrence of stress concentrations can furthermore be reduced if the depression has a substantially constant radius of curvature in the transition from the abutment surface to the centering outer circumferential surface.

For example, a radius of curvature of the depression in the transition from the abutment surface to the centering outer circumferential surface can be in the range of from 1.1 mm to 1.4 mm, preferably about 1.25 mm. A radius of curvature in this value range ensures, on the one hand, that stress concentrations are avoided, but, on the other hand, ensures the smallest possible extent of the depression in the axial or radial direction.

In order to keep the mechanical loads introduced into the connection element via the centering section as low as possible, but nevertheless to be able to achieve a sufficient centering function, it is proposed that an axial length of the centering section is in the range of from 3 mm to 6 mm, preferably about 3.5 mm.

In order to be able to connect the connection element to further components, for example, an exhaust gas treatment unit having at least one catalytic converter or/and at least one particle filter in an exhaust gas treatment unit housing, it is possible, on an axially opposite side of the connecting flange region from the centering section, for the connection element body to provide a connecting section, which provides a second axial end of the connection element body, for attachment to an exhaust gas carrying component of an exhaust system.

The disclosure furthermore relates to an exhaust system for an internal combustion engine, including a connection element constructed in accordance with the disclosure and a mating connection element having a mating connecting flange region, which provides a mating abutment surface, and having an exhaust gas passage of the mating connection element, which passage is delimited by an inner circumferential surface of the mating connection element, wherein the centering section is positioned so as to engage in the exhaust gas passage of the mating connection element when the abutment surface is supported with respect to the mating abutment surface.

To ensure that the fit of the centering section is as good as possible, the inner circumferential surface of the mating connection element can be of substantially cylindrical configuration, at least in the longitudinal region which receives the centering section.

In order to be able to achieve a sufficient centering function, on the one hand, and to avoid an excessively strong contact pressure between the connection element and the mating connection element when subject to thermal loading, on the other hand, it is proposed that a difference between an inner dimension, preferably inner diameter, of the inner circumferential surface of the mating connection element and an outer dimension, preferably outer diameter, of the centering outer circumferential surface is in the range of from 0.1 mm to 0.5 mm. There is thus a sufficiently large interspace between the centering outer circumferential surface and the inner circumferential surface of the mating connection element, and therefore expansions of these components which occur under thermal loading cannot lead to an excessively high contact pressure between them.

BRIEF DESCRIPTION OF THE DRAWINGS

The invention will now be described with reference to the drawings wherein.

DESCRIPTION OF THE PREFERRED EMBODIMENTS

Figure 1:
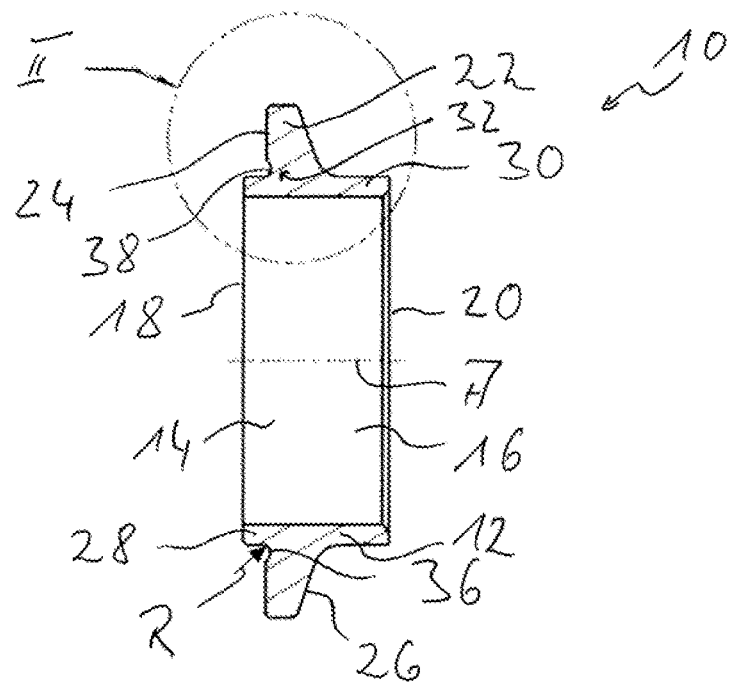
FIG. 1 shows a longitudinal sectional view of a connection element.

In FIG. 1, a connection element for an exhaust system of an internal combustion engine is denoted overall by 10. The connection element, which is provided as a one-piece metal component, includes a tubular connection element body 12, which, with a substantially cylindrical inner circumferential surface 14, which is configured, for example, with a circular cross section, surrounds an exhaust gas passage 16, through which exhaust gas can flow, of the connection element 10. Between a first axial end 18 and a second axial end 20 of the connection element body 12, a connecting flange region 22, which preferably completely encircles a connection element longitudinal axis A, extends radially outward from the connection element body. On its axial side facing the first axial end 18, the connecting flange region 22 has an abutment surface 24, which is oriented substantially orthogonally with respect to the connection element longitudinal axis A and encircles the latter completely. On its side facing the second axial end 20, the connecting flange region 22 has a connecting member supporting surface 26, which is angled with respect to the abutment surface 24 and completely encircles the connection element longitudinal axis A, and therefore the connecting flange region 22 has a structure which tapers radially outward from the connection element body 12.

A section of the connection element body 12 which extends between the connecting flange region 22 or the abutment surface 24 thereof and the first axial end 18 and thus projects axially beyond the abutment surface 24 in the direction of the connection element longitudinal axis A, forms a centering section 28, which is explained below with regard to its function. A section of the connection element body 12 which extends between the connecting flange region 22 or its connecting member abutment surface 26 and the second axial end 20 provides a connecting section 30, with which the connection element 10 can be attached to a component of an exhaust system.

Figure 2:
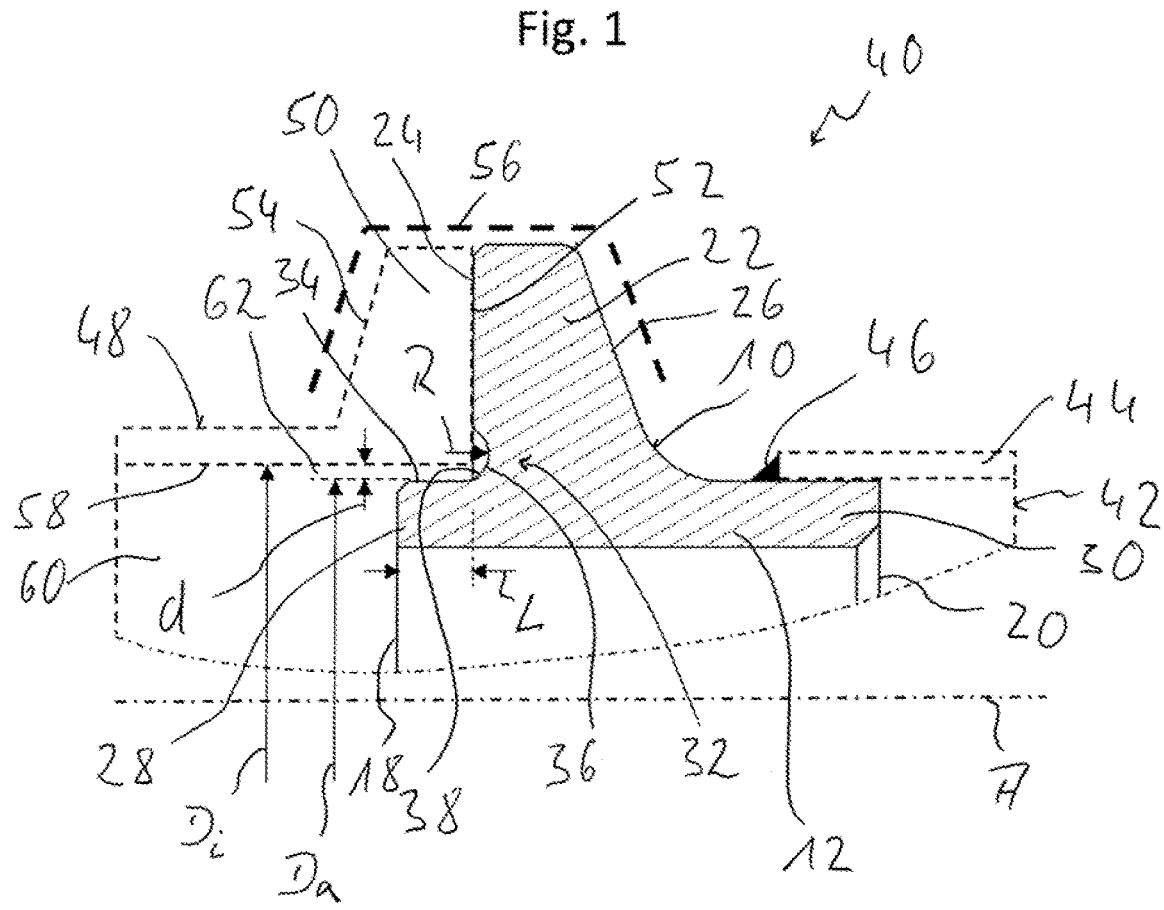
FIG. 2 shows the detail II of the connection element of FIG. 1 on an enlarged scale and in conjunction with further components of an exhaust system; and, FIGS. 3A and 3B schematically illustrate variations to the configuration or positioning of the depression provided in the transitional region between the abutment surface and the centering outer circumferential surface.

FIG. 2 shows more clearly that a depression 36 is formed in a transitional region 32 between the abutment surface 24 of the connecting flange region 22, the surface being substantially orthogonal with respect to the connection element longitudinal axis A, and a substantially cylindrical outer circumferential surface 34, configured, for example, with a circular cross-sectional profile, of the centering section 28, the depression preferably completely encircling the connection element longitudinal axis A. In the embodiment illustrated in FIG. 2, the depression 36 is configured in such a way that its depression surface 38 has been set back in the direction away from the first axial end 18 of the connection element body 12 with respect to the abutment surface 24. Furthermore, the depression 36 is configured in such a way that its depression surface 38 lies completely radially outside the centering outer circumferential surface 34 or adjoins the centering outer circumferential surface 34 with its radially inner end region. The connection of the depression surface 38 to the centering outer circumferential surface 34 or/and to the abutment surface 24 is preferably configured in such a way that a transition leading to a kink or an edge is avoided.

The depression 36 has a substantially constant radius of curvature R in the range of from 1.1 mm to 1.4 mm, preferably about 1.25 mm, in its substantial region of extent between the abutment surface 24 and the centering outer circumferential surface 34. Only where the depression surface 38 adjoins the abutment surface 24 or the centering outer circumferential surface 34 can the depression surface 38 have a different or a changing radius of curvature in order to be able to provide the above-described kink-free or edge-free transition to the abutment surface 24 or to the centering outer circumferential surface 34.

By providing the depression 36 in the transitional region 32 between the abutment surface 24 and the centering outer circumferential surface 34 of the centering section 28, a sharp-edged, substantially right-angled transition is avoided. This means that mechanical and thermal loads which occur during operation do not lead to stress peaks since a more uniform stress or load distribution is achieved in the transition from the connecting flange region 22 to the centering section 28 by virtue of the curved transition between the abutment surface 24 and the centering outer circumferential surface 34. Thus, the occurrence of fatigue cracks caused by mechanical or thermal loads in this transitional region 32 can be very largely avoided.

FIG. 2 shows the connection element 10 in an exhaust system 40 illustrated schematically. The connecting section 30 of the connection element body 12 is connected to a component, denoted in general by 42, of an exhaust system, for example an exhaust gas treatment unit. For this purpose, the connecting section 30 can be inserted into a tubular housing section 44 and can be connected firmly thereto by a weld seam 46, which preferably completely encircles the connection element longitudinal axis A.

FIG. 2 further shows the connection element 10 in combination with a mating connection element 48, which can be provided, for example, on a downstream region of a turbocharger of the exhaust system 40. The mating connection element 48 has a mating connecting flange region 50, which has a mating abutment surface 52 for the axial abutment of the abutment surface 24 of the connection element 10. On its axial side facing away from the mating abutment surface 52, the mating connecting flange region 50 provides a mating connecting member supporting surface 54, which is angled with respect to the mating abutment surface 52, with the result that the mating connecting flange region 50 also has a contour which tapers radially outward.

Via a connecting member 56, which fits around the connecting flange region 22 and the mating connecting flange region 50 radially from the outside and can be configured, for example, in the manner of a pipe clamp or the like, the connection element 10 and the mating connection element 48 are pressed against one another in the direction of the connection element longitudinal axis A, with the result that the abutment surface 24 and the mating abutment surface 52 are pressed firmly against one another in a gastight manner. If necessary, a ring-type sealing element can be arranged between them. In the case of an alternative type of connection of the connection element 10 to the mating connection element 48, it is possible to use screw bolts which engage in the flange regions 22, 50 or pass through them.

The mating connection element 48 provides an inner circumferential surface 58 which radially outwardly defines an exhaust gas passage 60 of the mating connection element 48. The inner circumferential surface 58 of the mating connection element 48 has a cross-sectional geometry matched to the cross-sectional geometry of the centering outer circumferential surface 34, at least in that longitudinal region in which, in the assembled state, the connection element 10 is positioned with its centering section 28 engaging in the exhaust gas passage 60 of the mating connection element 48. For example, at least in this longitudinal region, the inner circumferential surface 58 can have a substantially cylindrical structure, for example with a circular cross section.

FIG. 2 illustrates that an inner dimension, that is, for example, the inner diameter $D_i$ of the inner circumferential surface 58 or of the exhaust gas passage 60 of the mating connection element 48, is greater than an outer dimension, for example the outer diameter $D_a$, of the connection element 10 or of the connection element body 12 in the region of the centering outer circumferential surface 34, and therefore, when the connection element 10 and mating connection element 48 are aligned exactly radially with one another, a gap-like interspace 62 is formed with a dimension d which corresponds to half the difference between the inner dimension or the inner diameter $D_i$ and the outer dimension or the outer diameter $D_a$. This difference can be in the range of from 0.1 mm to 0.5 mm. This ensures that, despite a sufficiently precisely acting centering function of the centering section 28, contact which leads to too great a pressure between the centering section 28 and the mating connection element 48 is avoided, even when the mating connection element 48 and the connection element 10 are strongly heated, and, in particular, this also makes a contribution to relieving the transitional region 32 between the abutment surface 24 and the centering outer circumferential surface 34.

A comparatively short configuration of the centering section 28, that is, of the part of the connection element body 12 which extends axially between the abutment surface 24 and the first axial end 18, makes a further contribution to relief in this region. A length L of the centering section 28 is preferably in the range of from 3 mm to 6 mm, most preferably about 3.5 mm. Such dimensioning of the centering section 28 ensures, on the one hand, a sufficiently reliable centering function via the latter when the connection element 10 is joined to the mating connection element 48, but significantly reduces the forces introduced into the connection element 10 via the centering section 28.

Figures 3A, 3B:
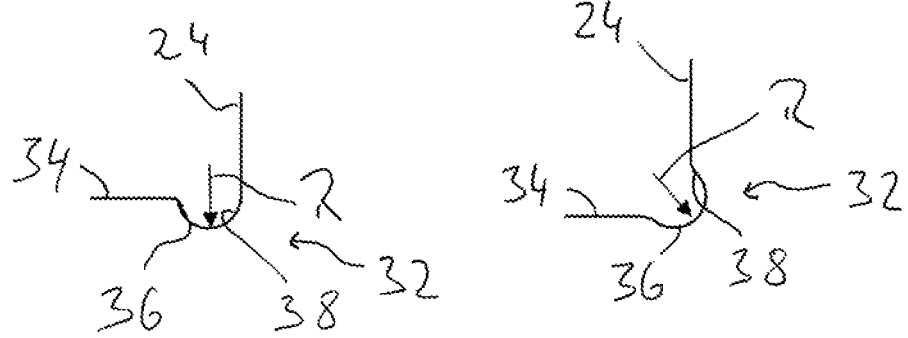

FIGS. 3A and 3B schematically illustrate variations in respect of the configuration or positioning of the depression 36 provided in the transitional region 32 between the abutment surface 24 and the centering outer circumferential surface 34. In the variant embodiment shown in FIG. 3A, the depression 36 is positioned in such a way that the depression surface 38 thereof is set back radially inward with respect to the centering outer circumferential surface 34 but lies axially completely within the region of the centering section 28 and therefore does not axially overlap the abutment surface 24. In the case of the positioning of the depression 36 illustrated in FIG. 3B, the depression surface 38 thereof is set back radially inward with the region of the depression adjoining the centering outer circumferential surface 34, and is offset axially in the direction away from the first end 18 of the connection element body 12 with the region of the depression adjoining the abutment surface 24.

In the case of the variant embodiments illustrated in FIGS. 3A and 3B, too, the depression surface 38 preferably adjoins the abutment surface 24 or the centering outer circumferential surface 34 in such a way that a kink-like or edge-like transition is avoided. By positioning the depression 36 in the manner illustrated in FIGS. 3A and 3B, the occurrence of stress peaks in the transitional region 32 is likewise avoided if, during the operation of an exhaust system, the connection element 10 is subject to a comparatively high thermal and mechanical load.

Although the connection element described above and illustrated in the figures can be used in a particularly advantageous manner if it is used to connect an exhaust system region downstream of a turbocharger to a mating connection element provided on the turbocharger, it should be noted that a connection element of this kind can, of course, also be used in other regions of an exhaust system in order to connect two components of an exhaust system to one another, in which case the connection element is then provided on one of these components and the mating connection element or a formation corresponding to such a mating connection element 48 is provided on the other of these components.

It is understood that the foregoing description is that of the preferred embodiments of the invention and that various changes and modifications may be made thereto without departing from the spirit and scope of the invention as defined in the appended claims.

What is claimed is:

1. A connection element for an exhaust system of an internal combustion engine, the connection element defining a longitudinal axis (A) and comprising:
a connection element body extending in the direction of said longitudinal axis (A) and having a first axial end;
said connection element body defining an inner circumferential surface delimiting an exhaust gas passage of said connection element;
a connecting flange extending radially outward from said connection element body and surrounding said longitudinal axis (A);
said connecting flange having an abutment surface orientated in the direction of said first axial end of said connection element body;
said connection element body having a portion thereof projecting axially beyond said abutment surface to define said first axial end and to define a centering section;
said centering section defining a centering outer circumferential surface; and,
wherein at least one of the following applies:
i) a depression surrounds said longitudinal axis (A) and said depression defines a depression surface offset axially in a direction away from said first axial end with respect to said abutment surface; and,
ii) a depression surrounds said longitudinal axis (A) and said depression defines a depression surface offset radially inward with respect to said centering outer circumferential surface disposed in a transitional region between said abutment surface and said centering outer circumferential surface;
wherein said depression has a constant radius of curvature (R) in a transition from said abutment surface to said centering outer circumferential surface, and
wherein a radius of curvature (R) of said depression in said transition from said abutment surface to said centering outer circumferential surface lies in a range of 1.1 mm to 1.4 mm.

2. The connection element of claim 1, wherein at least one of the following applies: i) said abutment surface is orientated orthogonally with respect to said longitudinal axis (A); and, ii) said abutment surface completely surrounds said longitudinal axis (A).

3. The connection element of claim 1, wherein at least one of the following applies: i) said centering outer circumferential surface is cylindrical with respect to said longitudinal axis (A); and, ii) said centering outer circumferential surface completely surrounds said longitudinal axis (A).

4. The connection element of claim 1, wherein said depression completely surrounds said longitudinal axis (A).

5. The connection element of claim 1, wherein a radius of curvature (R) of the depression in a transition from said abutment surface to said centering outer circumferential surface is about 1.25 mm.

6. The connection element of claim 1, wherein said centering section has an axial length lying in a range of 3 mm to 6 mm.

7. The connection element of claim 6, wherein said centering section has an axial length of about 3.5 mm.

8. The connection element of claim 1, wherein said connecting flange has an opposite side facing away from said centering section; and, said connection element body has a connecting section on said opposite side and said connecting section defines a second axial end of said connection element body and said connecting section is configured for attachment to an exhaust gas carrying component of the exhaust system.

9. An exhaust system for an internal combustion engine, the exhaust system comprising:
a first connection element defining a longitudinal axis (A) and including:
a connection element body extending in the direction of said longitudinal axis (A) and having a first axial end;
said connection element body defining an inner circumferential surface delimiting an exhaust gas passage of said connection element;
a first connecting flange extending radially outward from said connection element body and surrounding said longitudinal axis (A);
said first connecting flange having a first abutment surface orientated in the direction of said first axial end of said connection element body;
said connection element body having a portion thereof projecting axially beyond said first abutment surface to define said first axial end and to define a centering section;
said centering section defining a centering outer circumferential surface; and,
wherein at least one of the following applies:
i) a depression surrounds said longitudinal axis (A) and said depression defines a depression surface offset axially in a direction away from said first axial end with respect to said first abutment surface; and,
ii) a depression surrounds said longitudinal axis (A) and said depression defines a depression surface offset radially inward with respect to said centering outer circumferential surface disposed in a transitional region between said first abutment surface and said centering outer circumferential surface;
a second connection element having a second connecting flange for mating with said first connecting flange;
said second connecting flange having a second abutment surface for mating with said first abutment surface;
said second connection element having an inner circumferential surface delimiting an exhaust gas passage thereof; and,
said centering section being positioned so as to engage in the exhaust gas passages of said second connection element when said first abutment surface is supported with respect to said second abutment surface;
wherein said depression has a constant radius of curvature (R) in a transition from said abutment surface to said centering outer circumferential surface, and
wherein a radius of curvature (R) of said depression in said transition from said abutment surface to said centering outer circumferential surface lies in a range of 1.1 mm to 1.4 mm.

10. The exhaust system of claim 9, wherein said inner circumferential surface of said second connection element is cylindrical at least in a longitudinal region whereat said centering section is received.

11. The exhaust system of claim 9, wherein a difference between an inner dimension of said inner circumferential surface of said second connection element and an outer dimension of said centering outer circumferential surface lies in the range of 0.1 mm to 0.5 mm.

12. The exhaust system of claim 11, wherein said difference is the difference between an inner diameter ($D_i$) of said circumferential surface of said second connection element and an outer diameter ($D_a$) of said centering outer circumferential surface.

13. The connection element of claim 1, wherein, when said depression defines a depression surface offset radially inward with respect to said centering outer circumferential surface disposed in a transitional region between said abutment surface and said centering outer circumferential surface, said depression does not axially overlap said abutment surface.

14. A connection element for an exhaust system of an internal combustion engine, the connection element defining a longitudinal axis (A) and comprising:
a connection element body extending in the direction of said longitudinal axis (A) and having a first axial end;
said connection element body defining an inner circumferential surface delimiting an exhaust gas passage of said connection element;
a connecting flange extending radially outward from said connection element body and surrounding said longitudinal axis (A);
said connecting flange having an abutment surface orientated in the direction of said first axial end of said connection element body;
said connection element body having a portion thereof projecting axially beyond said abutment surface to define said first axial end and to define a centering section;
said centering section defining a cylindrical centering outer circumferential surface; and,
wherein a depression surrounds said longitudinal axis (A); and
wherein said depression defines a depression surface offset axially in a direction away from said first axial end with respect to said abutment surface and offset radially inward with respect to said centering outer circumferential surface disposed in a transitional region between said abutment surface and said centering outer circumferential surface.

15. The connection element of claim 14, wherein said depression has a constant radius of curvature (R) in a transition from said abutment surface to said centering outer circumferential surface and a radius of curvature (R) of said depression in said transition from said abutment surface to said centering outer circumferential surface lies in a range of 1.1 mm to 1.4 mm.

16. A connection element for an exhaust system of an internal combustion engine, the connection element defining a longitudinal axis (A) and comprising:
a connection element body extending in the direction of said longitudinal axis (A) and having a first axial end;
said connection element body defining an inner circumferential surface delimiting an exhaust gas passage of said connection element;
a connecting flange extending radially outward from said connection element body and surrounding said longitudinal axis (A);
said connecting flange having an abutment surface orientated in the direction of said first axial end of said connection element body;
said connection element body having a portion thereof projecting axially beyond
said abutment surface to define said first axial end and to define a centering section;
said centering section defining a centering outer circumferential surface; and,
wherein a depression axially not overlapping said abutment surface surrounding said longitudinal axis (A) is disposed in a transitional region between said abutment surface and said centering outer circumferential surface, said depression defining a curved depression surface offset radially inward with respect to said centering outer circumferential surface and having an edge-free transition to said abutment surface.

17. The connection element of claim 16, wherein said depression has a constant radius of curvature (R) in a transition from said abutment surface to said centering outer circumferential surface and a radius of curvature (R) of said depression in said transition from said abutment surface to said centering outer circumferential surface lies in a range of 1.1 mm to 1.4 mm.

* * * * *